Jan. 3, 1933.  J. G. BLUNT  1,893,194
FLUID PRESSURE ARTICULATED CONDUIT
Filed March 5, 1931
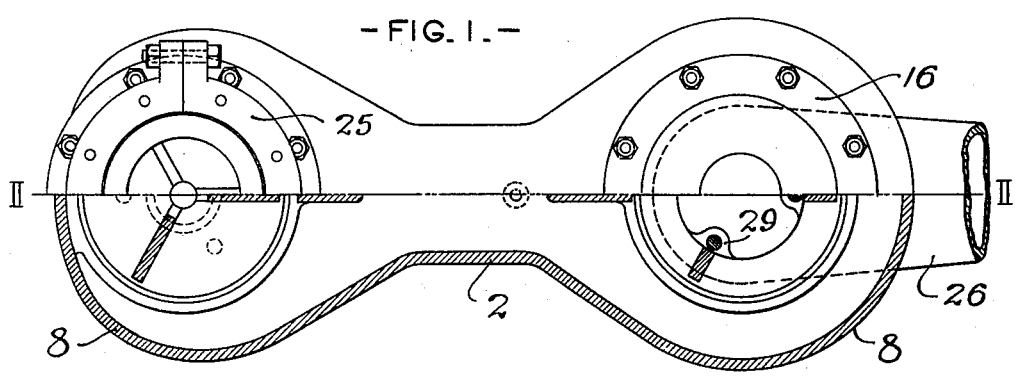
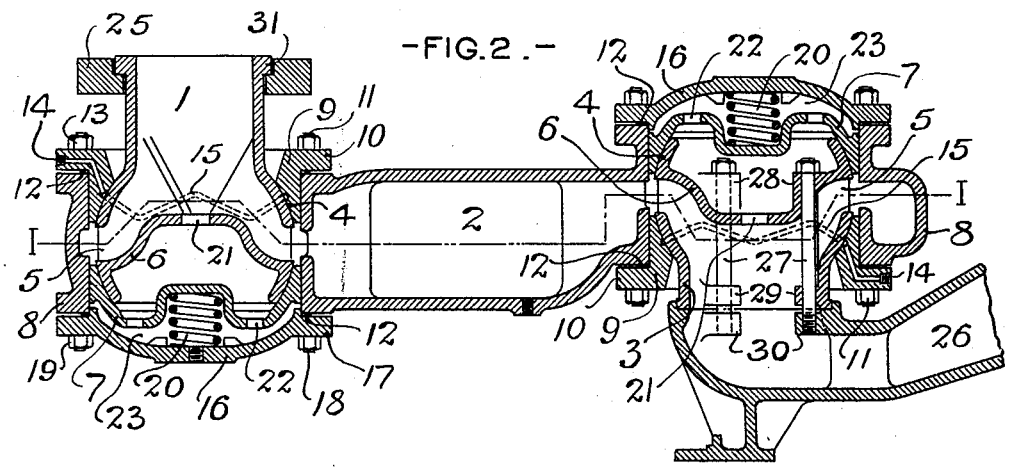
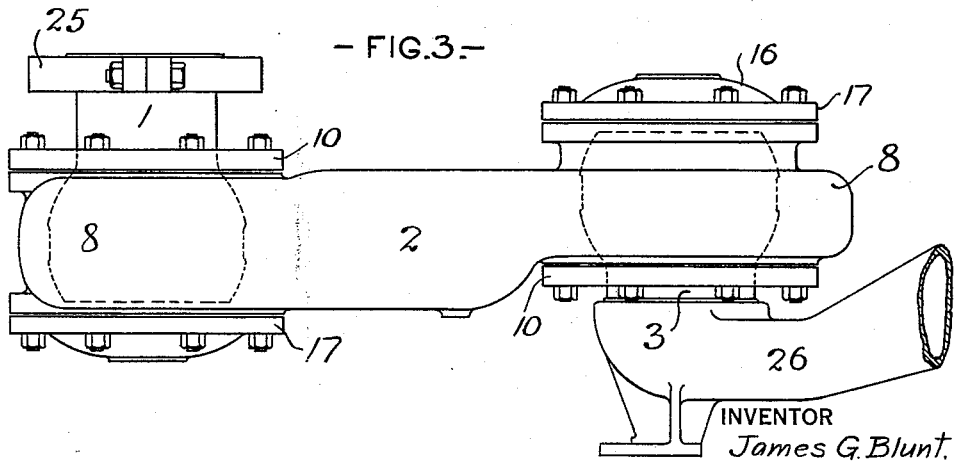
INVENTOR
James G. Blunt.
BY
ATTORNEY Patented Jan. 3, 1933

1,893,194

UNITED STATES PATENT OFFICE

JAMES G. BLUNT, OF SCHENECTADY, NEW YORK

FLUID PRESSURE ARTICULATED CONDUIT

Application filed March 5, 1931. Serial No. 520,328.

This invention relates generally to the class or type of appliances known as conduits for the conveyance of fluid under pressure and particularly to conduits having articulated sections.

One of the special uses of such conduits is for supplying steam from the boiler of a locomotive to the cylinders which propel the wheels of swivelling or articulated frames which are connected under the boiler. In such use it is of great importance to maintain tight joints between the conduit sections in order to prevent leakage.

The object of the present invention is to provide a metallic joint for connecting the sections of a fluid pressure conduit, which will be of such construction as to substantially prevent the leakage of fluid carried therein while comprising a compact, sturdy and efficient articulation.

A further object of the invention is to provide a joint of the character described, wherein the pressure of the fluid conveyed therethrough will be utilized to maintain the joint in tight engagement.

Other objects and advantages of the invention will be apparent from the following detailed description.

The invention is illustrated in the accompanying drawing, wherein Fig. 1, at the top half, is a plan view of a conduit embodying this invention, and at the bottom half is a horizontal section of the same on the line 1—1 of Fig. 2; Fig. 2 is a vertical section beyond the line 2—2 of Fig. 1; and Fig. 3 is a side view in elevation of the same.

In the practice of the invention, referring descriptively to the specific embodiment thereof which has been selected for exemplification herein, the conduit of the instant invention comprises sections 1, 2 and 3, which are articulated to afford relative movement and to permit the passage therethrough of fluid under pressure, as hereinafter fully described, the fluid being introduced into the section 1, and discharged through the section 3. It will be apparent that the two articulations at the opposite ends of the horizontal sections 2, are substantially similarly constructed although being inverted with relation to each other. The sections 1 and 3, are terminated at their inner ends in truncated hollow spheres 4, in the side walls of which a plurality of spaced orifices 5, are formed, permitting the flow of fluid therethrough. Tapered deflecting walls, 6, are formed transversely in the spheres for deflecting fluid in its passage through the sections; in section 1, outwardly through the orifices 5, and in section 3, downwardly from the orifices through the section.

The section 2, comprises a longitudinal member substantially circular in transverse section and having its ends 8, enlarged and providing circular openings, the axes of which are at right angles to the axis of the longitudinal portion of the section. The spherical ends 4, of the adjacent sections 1 and 3, are disposed within the openings of the annular ends 8. On the sides of the horizontal axial planes of the spheres adjacent the tubular portions of the sections, in the spaces between their outer surfaces and the inner walls of the annular ends are disposed metal rings, 9, the inner peripheries of which are shaped to provide seats for the spheres. Outwardly extending flanges 10, are integrally formed on the rings 9, and the rings are secured to the annular ends 8 by studs 11, which are passed through the flanges into the said ends, and which are provided with nuts 13.

Passageways 14, are formed on the rings 9, and irregular grooves 15, are formed in their inner surfaces in communication with the passageways, by means of which passageways and grooves lubricant may be supplied and distributed over the seats of the spheres. Concave seats 7 are provided for the spheres 4, on the other sides of their horizontal axial planes, the peripheries of which seats are disposed within the spaces between the walls of the annular ends 8 and the outer surfaces of the spheres.

Cover plates 16, are disposed adjacent the seats 7, and are provided with outwardly extending flanges 17, by which they are secured to the annular ends 8, by studs 18, which are provided with nuts 19. Helical springs 20 are disposed between the cover plates 16, and the seats 7, so that when the nuts 19, are drawn up on the studs 18, and the cover plates are compressed against the springs, the seats 7, are forced against the spheres which are in turn forced against the rings 9, and tight pressure fits of the several elements of the joints are thereby afforded.

Openings 21, are provided in the central portions of the deflecting walls 6, of the spheres, and openings 22, are provided in the seats 7, thereby permitting fluid under pressure to pass into the chambers 23, between the seats 7, and the covers 16, whereby unbalanced pressures are effected on the spheres forcing the same against the rings 9, and effecting the tight engagement of the elements of the articulations. Between the flanges 10, and the adjacent surfaces of the ends, 8, and between the flanges 17, and the surfaces of the ends 8 adjacent thereto soft metal rings 12, are compressed, which rings act to prevent leakage of fluid. When there is no fluid under pressure passing through the conduit the elements of the articulations are, as aforesaid, held in tight engagement by the action of the springs, 20.

While the articulations at the opposite ends of the horizontal section 2, are of substantially identical constructions, as aforesaid, it will be noted that the outside of the annular end 8, at the jointure between sections 1 and 2, is shown flattened. By virtue of this formation a saving of space is effected which in certain types of locomotive structures to which the conduit may be applied, will be desirable.

A sectional ring, 25, is disposed around section 1, engaging a flange 31, which is formed on said section, thereby providing means for attaching the conduit section to another conduit or to an outlet port (not shown). The lower end of the conduit section 3, is of sufficiently small diameter to permit the ring 9, which is formed in one piece, to be passed over it. The section 3 is rigidly secured to a fourth section 26, by studs 27, which pass through bosses 28, formed on the deflecting wall 6, of the sphere, and the lugs 29, formed on the conduit section 3, and are secured in the lugs 30, formed on the conduit section 26.

In the prior art, passages formed in the peripheries of the spheres of conduit members and deflecting walls similar to those employed in the instant invention, have been used to direct the flow of pressure fluid through the conduit. Heretofore, however, packing has been applied at the sides of the horizontal axial planes of the spheres and balanced joints have been effected. The instant invention provides an unbalanced joint wherein the pressure of the fluid conveyed through the conduit is utilized to hold the elements of the articulation in tight engagement. A joint is thus provided which substantially eliminates leakages and which comprises a sturdy compact and efficient structure.

While there has been hereinbefore described a specific embodiment of this invention, it will be understood that many and various changes and modifications in procedure, form, structure, and details, of the same may be made without departing from the spirit of the invention, and that all and any such changes and modifications are contemplated as a part of this invention, within the scope of the appended claims. It will also be understood that while a conduit wherein two of the improved articulations of this invention are employed has been hereinbefore described, one of said articulations alone, or any number together may be used, as desired, and any and all such embodiments constitute parts of this invention.

I claim as my invention and desire to secure by Letters Patent:

1. A fluid pressure conduit, comprising a plurality of sections articulated to afford relative movement, a hollow sphere formed on the end of one of said sections having openings formed in its periphery and a tapered transverse deflecting wall for directing the flow of fluid through said sphere; an annular end formed on an adjacent section having openings adjacent the openings in said sphere to permit the passage of fluid from the first section to the second section; a seat for said sphere disposed on one side of said openings between said sphere and said annular end, and secured to said annular end; a plunger-like seat for said sphere disposed on the opposite side of said openings having a portion disposed between said sphere and said annular end; and a cover mounted on said annular end adjacent the last said seat and providing a chamber therebetween, the said deflecting wall and plunger-like seat having openings formed therein to permit the passage of fluid into the said chamber, whereby pressure of fluid carried through said conduit will be utilized to force the plunger-like seat against the sphere to hold the said sphere and the said seats in tight engagement.

2. A fluid pressure conduit, comprising a section having an opening in a wall thereof; a section having an end portion housed in said first mentioned section and extending through said opening to form an articulated joint between said sections, the end wall of said end portion being spaced from an oppositely disposed wall of said first mentioned section; a seat for said end portion carried by said first mentioned section; and a plunger-like element within said space slidably engaged by the first mentioned section, bearing against the said end wall and spaced from said oppositely disposed wall to provide a fluid containing chamber, said chamber being in communication at all times with the conduit to receive fluid pressure therefrom, whereby the pressure of the fluid within the chamber will force the plunger-like element against said end wall and force said end portion against said seat to provide a fluid-tight flexible joint therebetween.

3. A fluid pressure conduit, comprising a section having an opening in a wall thereof; a section having an end portion housed in said first mentioned section and extending through said opening to form an articulated joint between said sections, the end wall of said end portion being spaced from an oppositely disposed wall of said first mentioned section; a detachable seat for said end portion carried by said first mentioned section; and a plunger-like element within said space slidably engaged by the first mentioned section, bearing against the said end wall and spaced from said oppositely disposed wall to provide a fluid containing chamber, said chamber being in communication at all times with the conduit to receive fluid pressure therefrom, whereby the pressure of the fluid within the chamber will force the plunger-like element against said end wall and force said end portion against said seat to provide a fluid-tight flexible joint therebetween.

4. A fluid pressure conduit, comprising a section having an opening in a wall thereof; a section having an end portion housed in said first mentioned section and extending through said opening to form an articulated joint between said sections, the end wall of said end portion being spaced from an oppositely disposed wall of said first mentioned section; a seat for said end portion carried by said first mentioned section; a plunger-like element within said space slidably engaged by the first mentioned section, bearing against the said end wall and spaced from said oppositely disposed wall to provide a fluid containing chamber; and resilient means disposed within said chamber bearing against said end wall and said oppositely disposed wall to hold the parts in engagement, said chamber being in communication at all times with the conduit to receive fluid therefrom, whereby the pressure of fluid within the chamber will force the plunger-like element against said end wall and said end portion against said seat, to provide a fluid-tight flexible joint therebetween.

5. A fluid pressure conduit, comprising a section having an opening in a wall thereof; a second section having an end portion housed in said first mentioned section and extending through said opening to form an articulated joint between said sections, the end wall of said end portion being spaced from an oppositely disposed wall of said first mentioned section; a seat for said end portion carried by said first mentioned section; a plunger-like element within said space slidably engaged by the first mentioned section, bearing against the said end wall and spaced from said oppositely disposed wall to provide a fluid containing chamber, said chamber being in communication at all times with the conduit to receive fluid pressure therefrom, whereby the pressure of the fluid within the chamber will force the plunger-like element against said end wall and force said end portion against said seat to provide a fluid-tight flexible joint therebetween; a third section adjacent said second section; and means comprising lugs formed within said second and third sections, and bolts passed through said lugs, for detachably securing the said second and third sections together.

6. A fluid pressure conduit, comprising a section having an opening in a wall thereof; a section having an end portion extending through said opening and housed in said first mentioned section to form an articulated joint between said sections, the end wall of said end portion being spaced from an oppositely disposed wall of said first mentioned section; a seat for said end portion carried by the first mentioned section; and a plunger-like element within said space slidably engaged by said first mentioned section, bearing against the said end portion, spaced from said oppositely disposed wall, and arranged to provide fluid containing chambers at its opposite sides, said chambers being in communication at all times with the conduit to receive fluid pressure therefrom, said plunger-like element having a surface in the chamber on its side adjacent said end portion subjected to a fluid pressure in a direction away from said end portion and a surface within the chamber on its side adjacent said oppositely disposed wall subjected to a fluid pressure in the direction of said end portion, greater in amount than the pressure in the first said chamber, whereby the fluid within the second said chamber will force the plunger-like element against the said end portion and force said end portion against said seat to provide a fluid-tight flexible joint.

JAMES G. BLUNT.